United States Patent
Spangler

(10) Patent No.: US 10,641,103 B2
(45) Date of Patent: May 5, 2020

(54) TRAILING EDGE CONFIGURATION WITH CAST SLOTS AND DRILLED FILMHOLES

(71) Applicant: UNITED TECHNOLOGIES CORPORATION, Farmington, CT (US)

(72) Inventor: Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 342 days.

(21) Appl. No.: 15/409,613

(22) Filed: Jan. 19, 2017

(65) Prior Publication Data

US 2018/0202294 A1    Jul. 19, 2018

(51) Int. Cl.
| | |
|---|---|
| *F01D 5/18* | (2006.01) |
| *F01D 9/04* | (2006.01) |
| *F01D 11/08* | (2006.01) |
| *F01D 25/12* | (2006.01) |
| *F02C 3/04* | (2006.01) |
| *F02C 7/18* | (2006.01) |

(52) U.S. Cl.
CPC .............. *F01D 5/187* (2013.01); *F01D 5/18* (2013.01); *F01D 9/041* (2013.01); *F01D 11/08* (2013.01); *F01D 25/12* (2013.01); *F02C 3/04* (2013.01); *F02C 7/18* (2013.01); *F05D 2220/32* (2013.01); *F05D 2230/21* (2013.01); *F05D 2240/122* (2013.01); *F05D 2240/304* (2013.01); *F05D 2260/202* (2013.01); *Y02T 50/676* (2013.01)

(58) Field of Classification Search
CPC ............. F01D 5/187; F01D 5/186; F01D 5/18
See application file for complete search history.

(56) References Cited

U.S. PATENT DOCUMENTS

| | | |
|---|---|---|
| 3,782,852 A | 1/1974 | Moore |
| 3,799,696 A | 3/1974 | Redman |
| 3,806,274 A | 4/1974 | Moore |
| 6,210,111 B1 | 4/2001 | Liang |
| 6,514,037 B1 * | 2/2003 | Danowski ............... F01D 5/186 415/115 |
| 7,980,821 B1 | 7/2011 | Liang |

(Continued)

FOREIGN PATENT DOCUMENTS

| | | |
|---|---|---|
| EP | 1923152 A1 | 5/2008 |
| GB | 1366704 | 9/1974 |

OTHER PUBLICATIONS

European Search Report for European Application No. 18152646.8, dated Jun. 6, 2018.

*Primary Examiner* — Woody A Lee, Jr.
*Assistant Examiner* — Michael L Sehn
(74) *Attorney, Agent, or Firm* — Carlson, Gaskey & Olds, P.C.

(57) ABSTRACT

A gas turbine engine component comprises a body having a leading edge and a trailing edge. At least one internal channel is formed within the body, wherein the channel includes an inlet to direct cooling flow into the body. At least one cast slot is formed in the trailing edge. At least one drilled filmhole is formed in the trailing edge, wherein the cast slot and drilled filmhole direct flow from the internal channel to an external location from the body. A gas turbine engine, a method of manufacturing a gas turbine engine component, and a method of controlling flow in a gas turbine engine component.

22 Claims, 5 Drawing Sheets

(56) References Cited

U.S. PATENT DOCUMENTS

| | | |
|---|---|---|
| 8,052,392 B1 | 11/2011 | Liang |
| 8,079,813 B2 * | 12/2011 | Liang ..................... F01D 5/187 |
| | | 416/96 R |
| 8,231,330 B1 | 7/2012 | Liang |
| 8,613,597 B1 | 12/2013 | Liang |
| 9,017,026 B2 | 4/2015 | Bergholz, Jr. et al. |
| 9,145,773 B2 | 9/2015 | Bergholz, Jr. et al. |
| 9,175,569 B2 | 11/2015 | Bergholz, Jr. et al. |
| 9,228,437 B1 | 1/2016 | Liang |
| 9,464,528 B2 | 10/2016 | Zhang et al. |
| 2001/0012484 A1 | 8/2001 | Beeck et al. |
| 2010/0329835 A1 | 12/2010 | Spangler et al. |
| 2014/0369852 A1 * | 12/2014 | Zhang ..................... F01D 5/187 |
| | | 416/97 A |
| 2014/0377054 A1 * | 12/2014 | Zhang ..................... F01D 9/065 |
| | | 415/115 |

* cited by examiner

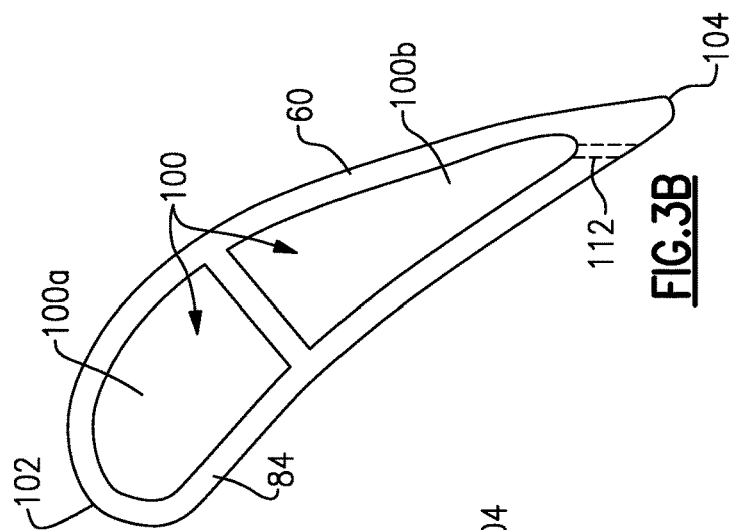
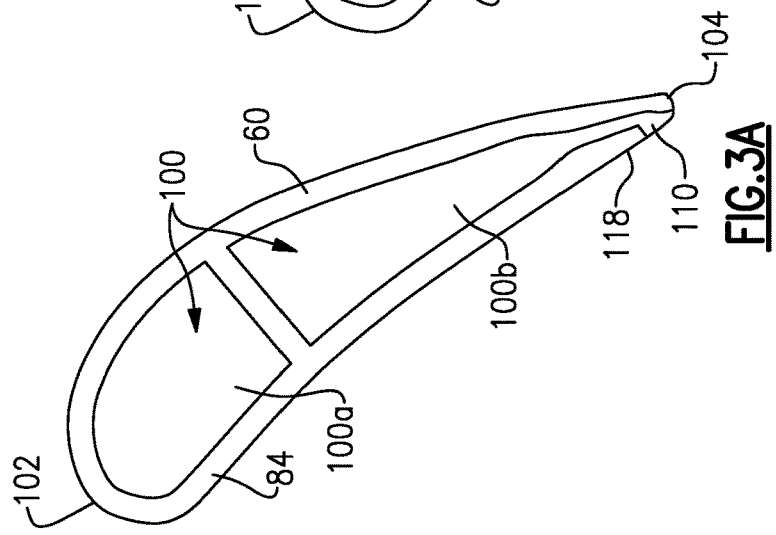
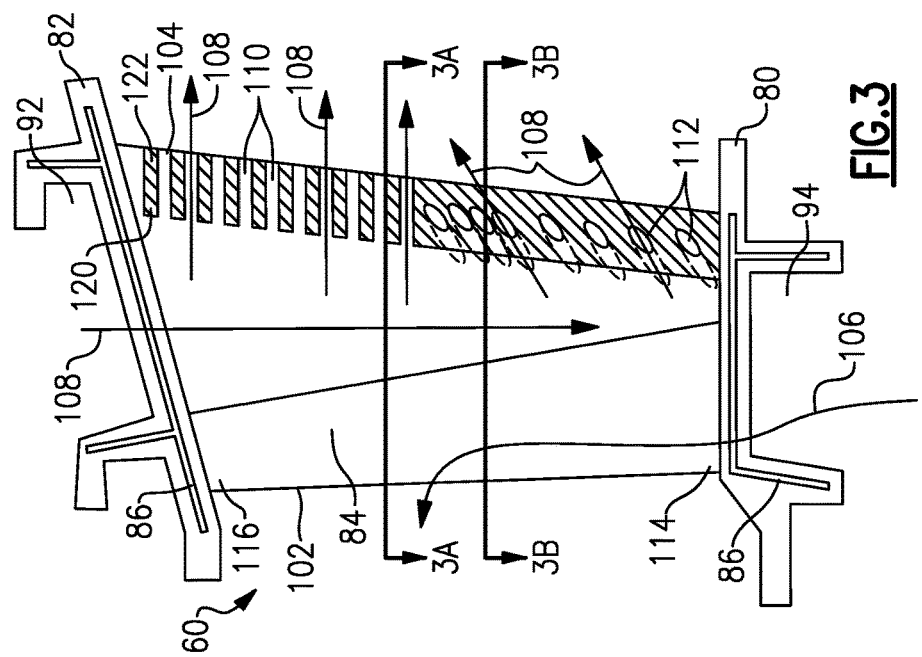

TRAILING EDGE CONFIGURATION WITH CAST SLOTS AND DRILLED FILMHOLES

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND OF THE INVENTION

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. A turbine section typically includes multiple stages of vanes and rotor blades used to extract a maximum amount of energy from the combustion flow. The efficiency of the engine is impacted by ensuring that the products of combustion pass in as high a percentage as possible across the turbine blades.

With each new engine design, gas temperatures increase and cooling flow requirements decrease. This requires cooling flow to be utilized in a more efficient manner and flow distribution to be tailored to prevent overcooling in certain regions. Because of radial gas temperature profiles, trailing edges of airfoils are a region where cooling flow distribution could be tailored and overall flow reduced. However, current cast trailing edges are already at the minimum area required to prevent core break during the casting process and thus do not allow a reduction or redistribution of flow. One option would be to replace cast trailing edge slots with drilled filmholes to allow a redistribution and reduction of cooling flow. However, this presents manufacturing challenges in the casting process resulting in an undesirable increase in variation of core position and wall thicknesses.

SUMMARY OF THE INVENTION

In a featured embodiment, a gas turbine engine component comprises a body having a leading edge and a trailing edge. At least one internal channel is formed within the body, wherein the channel includes an inlet to direct cooling flow into the body. At least one cast slot is formed in the trailing edge. At least one drilled filmhole is formed in the trailing edge, wherein the cast slot and drilled filmhole direct flow from the internal channel to an external location from the body.

In another embodiment according to the previous embodiment, at least one cast slot comprises a plurality of cast slots.

In another embodiment according to any of the previous embodiments, at least one drilled filmhole comprises a plurality of drilled filmholes.

In another embodiment according to any of the previous embodiments, at least one cast slot comprises a plurality of cast slots, and wherein the at least one drilled filmhole comprises a plurality of drilled filmholes.

In another embodiment according to any of the previous embodiments, the body extends from a radially inner end to a radially outer end, and wherein the cast slots are positioned radially outward of the drilled filmholes.

In another embodiment according to any of the previous embodiments, an axial direction is defined in a direction extending from the leading edge to the trailing edge, and wherein a radial direction is defined as a direction that is perpendicular to the axial direction, and wherein the cast slots extend in a generally axial direction and the drilled filmholes extend at an obtuse angle relative to the cast slots.

In another embodiment according to any of the previous embodiments, the body extends from a radially inner end to a radially outer end, and wherein the cast slots are positioned radially inward of the drilled filmholes.

In another embodiment according to any of the previous embodiments, an axial direction is defined in a direction extending from the leading edge to the trailing edge, and wherein a radial direction is defined as a direction that is perpendicular to the axial direction, and wherein the cast slots are interspersed with the drilled filmholes in a radial direction along the trailing edge.

In another embodiment according to any of the previous embodiments, the cast slots extend in the axial direction and the drilled filmholes extend at an obtuse angle relative to the cast slots.

In another embodiment according to any of the previous embodiments, the body comprises a vane, blade or BOAS.

In another embodiment according to any of the previous embodiments, the body comprises a turbine component.

In another featured embodiment, a gas turbine engine comprises a compressor section defining an engine center axis, a combustor section downstream of the compressor section, and a turbine section downstream of the combustor section. The turbine section includes a turbine component having a leading edge extending to a trailing edge to define an axial direction along the engine center axis, a radially inner end extending to a radially outer end to define a radial direction, at least one internal channel formed within the turbine component, wherein the channel includes an inlet to direct cooling flow into the turbine component. A plurality of cast slots is formed in the trailing edge. A plurality of drilled filmholes is formed in the trailing edge, wherein the cast slots and drilled filmholes direct flow from the internal channel to an external location from the turbine component.

In another embodiment according to previous embodiment, the turbine component comprises a vane, blade or BOAS.

In another embodiment according to any of the previous embodiments, the cast slots having a length greater than a width, and wherein the length extends in the axial direction and the drilled filmholes extend along an obtuse angle relative to the cast slots.

In another embodiment according to any of the previous embodiments, the cast slots are configured to position a core during a casting process for the turbine component.

In another featured embodiment, a method of manufacturing a gas turbine engine component comprises using a core to form at least one internal cooling channel in a body, wherein the body extends from a leading edge to a trailing edge. A plurality of slots is provided with the core to be located at the trailing edge, wherein the slots position the core during a casting process and form cast slots in the trailing edge. A plurality of filmholes are drilled in the trailing edge subsequent to the casting process, wherein the cast slots and filmholes are configured to direct flow from the internal cooling channel to an external location from the body.

In another embodiment according to the previous embodiment, the cast slots are formed to extend in a generally axial direction and forming the drilled filmholes to extend at an obtuse angle relative to the cast slots.

In another embodiment according to any of the previous embodiments, the cast slots are interspersed with the filmholes in a radial direction along the trailing edge.

In another embodiment according to any of the previous embodiments, filmhole sizes and spacing are tailored relative to the cast slots to meet cooling flow requirements for a specified engine configuration.

In another featured embodiment, a method of controlling flow in a gas turbine engine component comprises a body having a leading edge and a trailing edge. At least one internal channel is formed within the body, wherein the channel includes an inlet to direct cooling flow into the body. A plurality of flow exit features is formed along the trailing edge to tailor cooling flow to a predetermined amount at each desired location along an entire radial span of the trailing edge by providing one portion of trailing edge flow with cast slots and providing another portion of trailing edge flow with drilled holes.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 3 is a side view of the vane of FIG. 2.

FIG. 3A is a section view of a cast slot.

FIG. 3B is a section view of a drilled filmhole.

DETAILED DESCRIPTION

Figure 1:
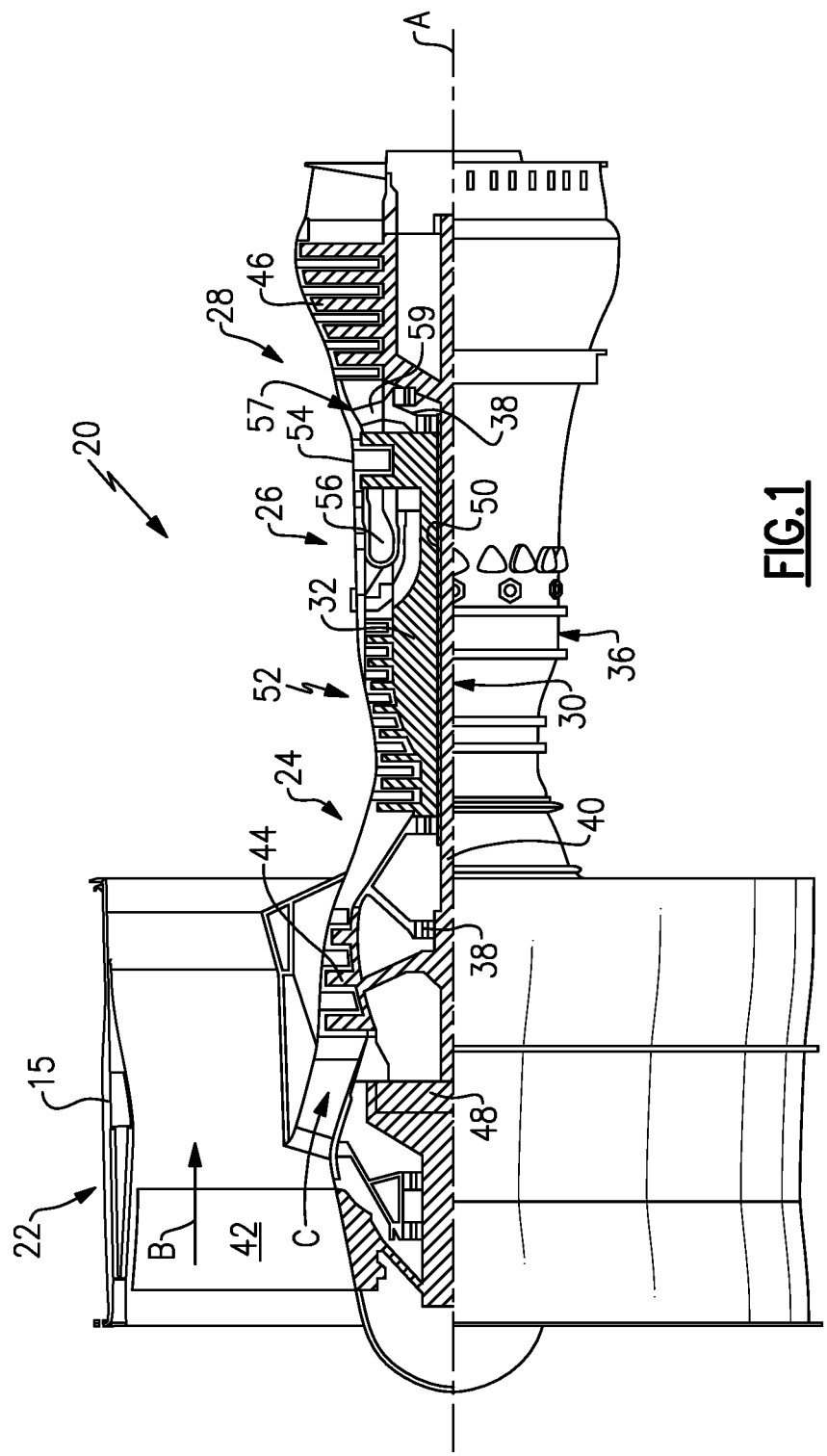
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
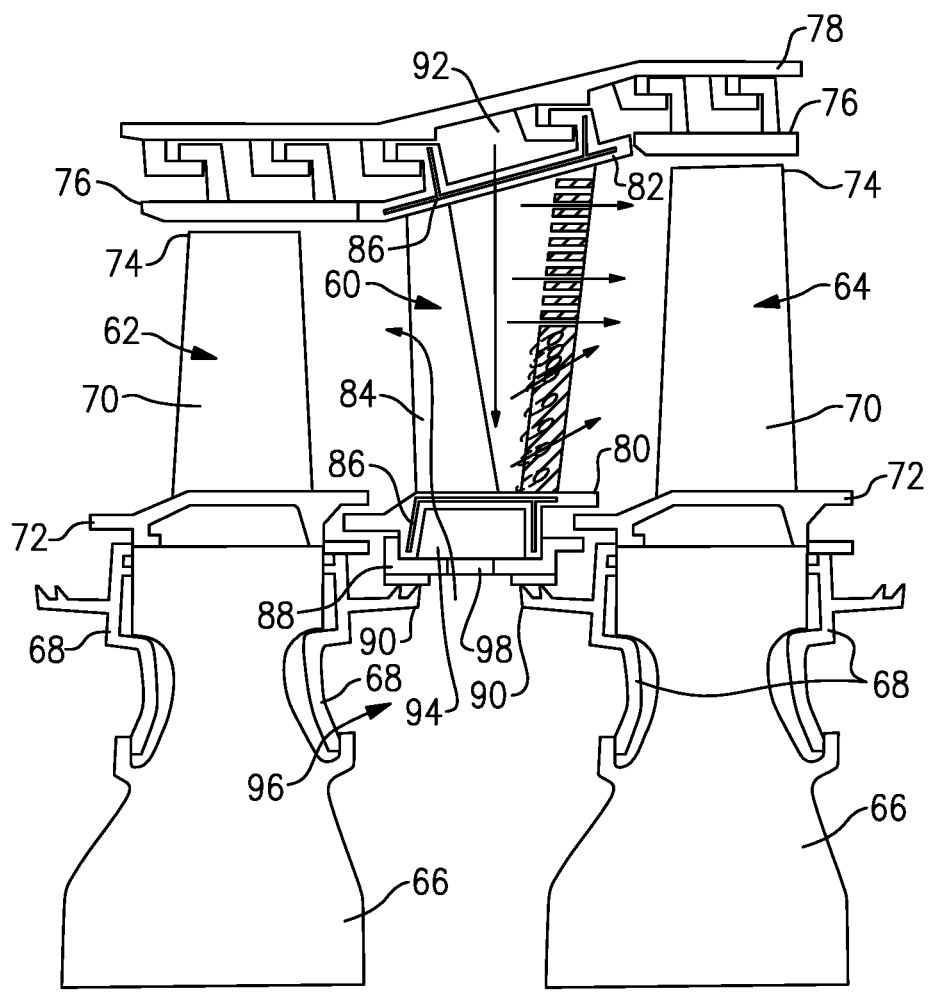
FIG. 2 is a schematic view of blades and a vane that incorporates the subject invention.

FIG. 2 shows a vane 60 positioned between a first blade 62 and a second blade 64 in the turbine section 28. In one example, the blades 62, 64 are attached to a full hoop disk 66 with fore and aft coverplates 68. The disks 66 are driven by a turbine rotor about the engine center axis A. Airfoil bodies 70 extend from a radially inward platform 72 of blades 62,64 to a tip 74. Blade outer air seals (BOAS) 76 are mounted to a radially outer full hoop case 78 and are spaced from the tips 74 by a small clearance gap as known.

The vane 60 includes a radially inner platform 80, a radially outward platform 82, and an airfoil body 84 extending between the radially inner platform 80 and radially outer platform 82. The vane 60 is coupled to the full hoop case 78 at the radially outer platform 82 and includes feather seals 86 between vane segments at the radially inner platform 80 and radially outer platform 82. A full hoop inner air seal 88 is coupled to the radially inner platform 80 and cooperates with seals 90 on the coverplates 68 of the blades 62, 64.

Between the full hoop case 78 and the radially outer platform 82 is a vane outer diameter cavity 92, and between the radially inner platform 80 and the inner air seal 88 is a vane inner diameter cavity 94. Radially inward of the inner air seal 88 and between the disks 66 is a rotor cavity 96. One or more orifices 98 are formed in the inner air seal 88 to direct flow into the vane inner diameter cavity 94. Cooling flow is also directed into the vane outer diameter cavity 92 as known.

Cooling channels 100 (FIG. 3A and 3B) are formed within the vane 60 to receive the cooling air flow. The airfoil body 84 of the vane 60 extends from a leading edge 102 to a trailing edge 104. In the example shown in FIG. 3, the air flow from the vane inner diameter cavity 94 is directed into a fore inner cooling channel 100a and is directed out from the airfoil body 84 via the leading edge 102 as indicated by arrow 106. The air from the vane outer diameter cavity 92 is directed into an aft inner cooling channel 100b and is directed out from the airfoil body 84 via the trailing edge 104 as indicated by arrows 108.

With each new engine design, gas temperatures increase and cooling flow requirements decrease. This requires cooling flow to be utilized in a more efficient manner and flow distribution to be tailored to prevent overcooling in certain regions. Because of radial gas temperature profiles, trailing edges of airfoils is an area where cooling flow distribution could be tailored and overall flow reduced. However, current cast trailing edges are already at the minimum area required to prevent core break during the casting process and thus do not allow a reduction or redistribution of flow.

A casting process uses a core to form open internal areas within a component. The core is positioned in a die and material is supplied to the die to flow around the core to cast the component. Once the component is cast the core is removed to provide the open areas within the component. As known, the casting process requires a certain core area to make sure the core remains intact during the process. For a cast airfoil body, the trailing edge includes a plurality of cast slots that extend from the inner diameter to the outer diameter. The slots are formed to be at the minimum size that is required to prevent core break during the casting process.

Further, the structure on the core used to form the slots helps position the core during the casting process. The resulting component includes cast slots for the entire radial span which results in excess cooling flow. Further, as the cast slots are the same along the radial span there is uniform cooling flow that is not tailorable to address hotter areas of the airfoil body. Replacing the cast trailing edge slots with drilled filmholes provides more tailoring to allow a redistribution and reduction of cooling flow. However, as discussed above, the cast trailing edge slots help position the core during the casting process and removing them would result in larger variation of the core position and in wall thicknesses.

The subject invention provides a configuration where the airfoil body 84 includes one or more cast slots 110 formed in the trailing edge 104 and one or more drilled cooling holes 112. The cast slots 110 and drilled filmholes 112 direct flow from the internal channel 100b to an external location of the body 84. The cast slots 110 are formed by core structures that are used to position the core during casting; however, drilled filmholes 112 are machined subsequent to casting to reduce excess cooling flow and to tailor flow to cool hotter areas of the body 84.

As shown in FIG. 3, the airfoil body 84 extends from a radially inner end 114 to a radially outer end 116. In one example, the cast slots 110 are positioned radially outward of the drilled filmholes 112. A section of a cast slot 110 is shown in FIG. 3A and a section of a drilled filmhole 112 is shown in FIG. 3B. The cast slot 110 extends from the internal channel 100b to an external surface 118 of the airfoil body 84. The cast slots 110 have a length that is greater than a width and extend from an inner slot end 120 to an outer slot end 122 at the external surface 118. The slots 110 can be located anywhere along the radial span of the airfoil body 84. The slots 110 can be the same length or variable lengths relative to each other.

The drilled filmhole 112 extends from the internal channel 100b to the external surface 118. The filmholes 112 can have different shapes and/or sizes and can be located anywhere along the radial span of the airfoil body 84. Further, the filmholes 112 can be orientated at different angles relative to the slots 110 and/or body surface.

In one example, an axial direction is defined in a direction extending from the leading edge 102 to the trailing edge 104, which is a direction that is common with the engine center axis A. A radial direction is defined as a direction that is perpendicular to the axial direction, and which extends radially outward from the center axis A. The cast slots 110 extend generally in the axial direction and the drilled filmholes 112 extend at an obtuse angle relative to the axially extending cast slots 110. In other words, the filmholes 112 are orientated to be neither perpendicular nor parallel to the cast slots 110. The filmholes 112 can be orientated at any of various angles to tailor cooling flow as needed.

In the example shown in FIG. 3, the cast slots 110 are positioned radially outward of the drilled filmholes 112. The cast slots 110 are spaced along the upper half of the radial span and the filmholes 112 are spaced along the lower half of the radial span. The cast slots 110 extend in an axial direction and the filmholes 112 are drilled at desired locations to tailor the flow to meet cooling flow requirements. In the example shown, the filmholes 112 extend from a fore hole end at a radial outward angle to an aft hole end. Further, filmholes 112 are more closely spaced together at the center of the body than at the radially inner end 114 to tailor cooling flow.

Figure 4:
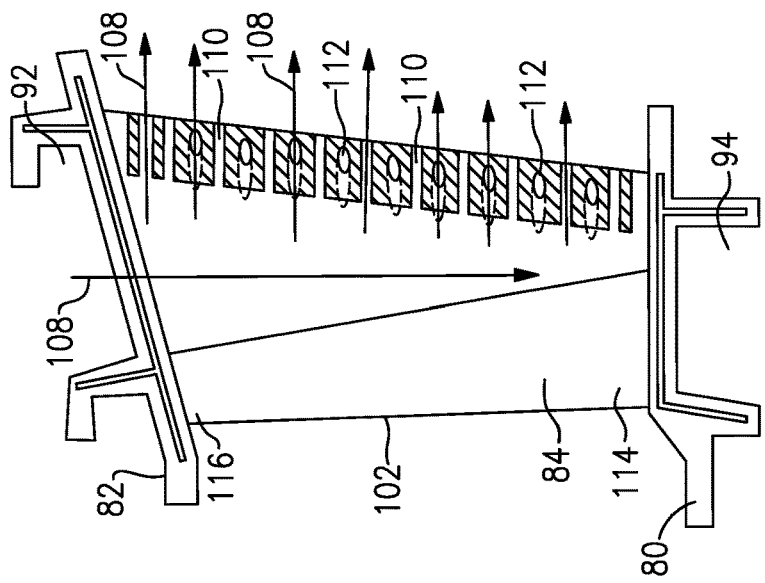
FIG. 4 is an example of radially inner slots and radially outer filmholes.

In the example shown in FIG. 4, the cast slots 110 are positioned radially inward of the drilled filmholes 112. The cast slots 110 are spaced along the lower half of the radial span and the filmholes 112 are spaced along the upper half of the radial span. The cast slots 110 extend in an axial direction and the filmholes 112 are drilled at desired locations to tailor the flow to meet cooling flow requirements. In the example shown, some filmholes 112 extend from a fore hole end in a radial outward angle to an aft hole end, while other filmholes 112 extend from the fore hole end at a radial inward angle to an aft hole end. Further, filmholes 112 are more closely spaced together at the radially outer end 116 than at a center of the body.

Figure 5:
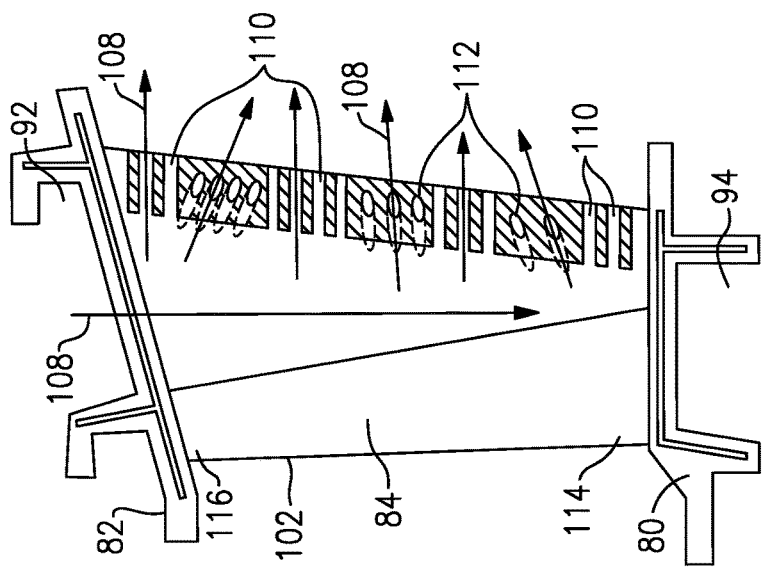
FIG. 5 is an example of interspersed slots and filmholes.
Figure 6:
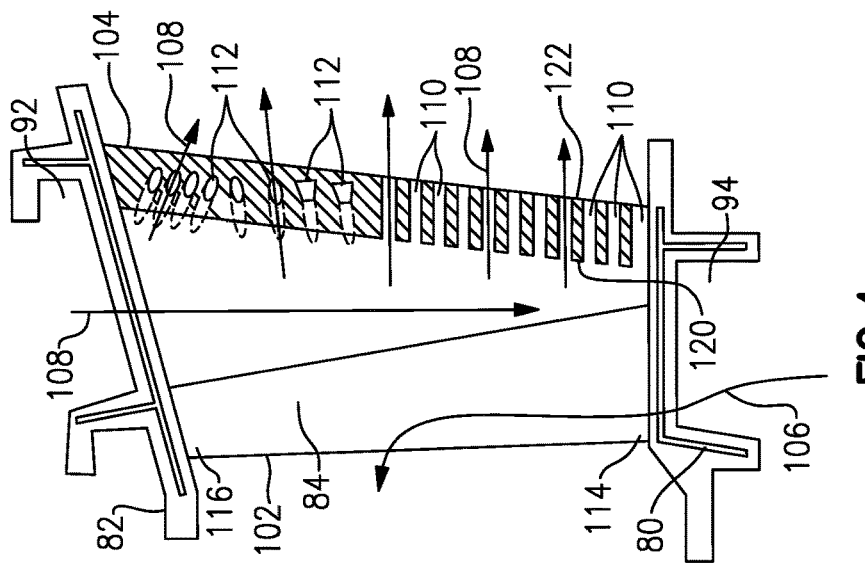
FIG. 6 is another example of interspersed slots and filmholes.

In the examples shown in FIGS. 5 and 6, the cast slots 110 are interspersed with the drilled filmholes 112 in the radial direction along the trailing edge 104 in various patterns. Further, the filmholes 112 have various shapes/sizes and are orientated at various angles relative to the axially extending cast slots 110.

Figure 7:
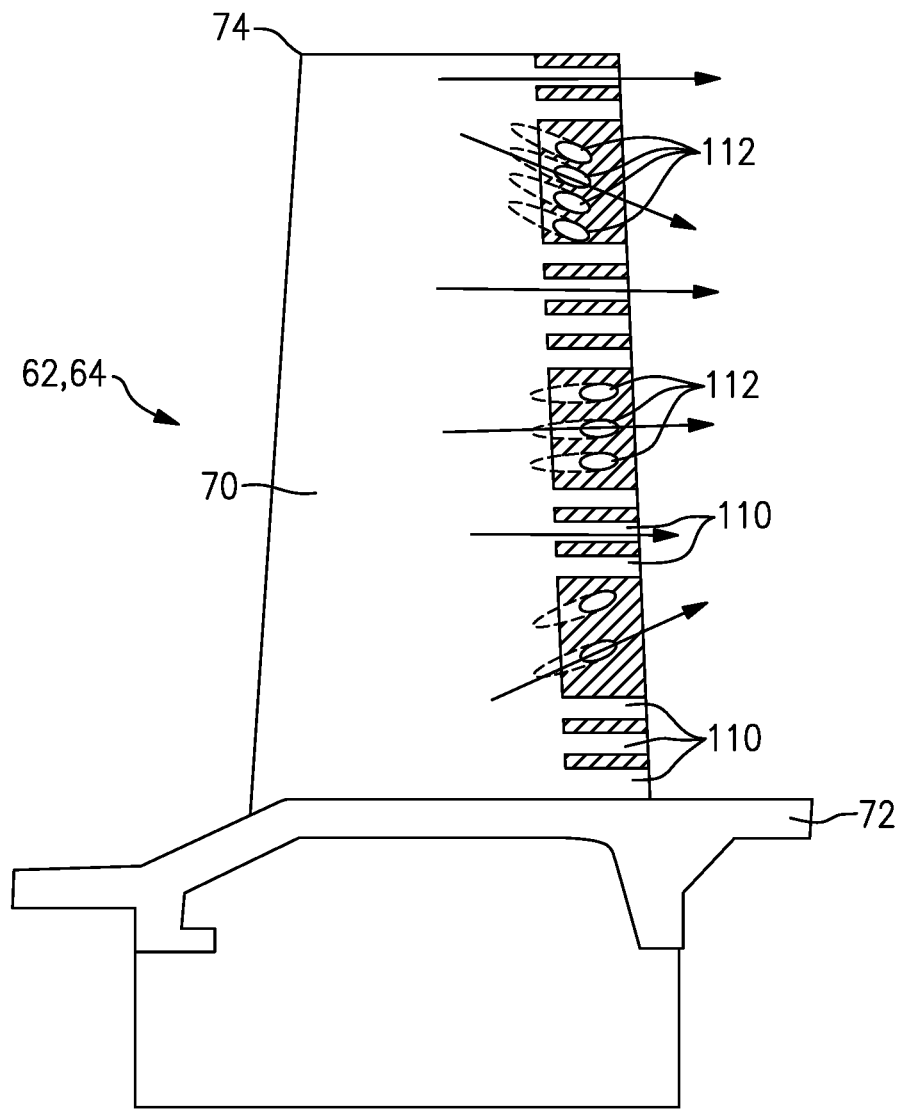
FIG. 7 is an example of the subject invention as used in a blade.

FIG. 7 shows an example where the cast slots 110 and filmholes 112 are formed in a turbine blade 62, 64. Optionally, the cast slots 110 and filmholes 112 could be formed in a trailing edge of a BOAS 76 as shown in FIG. 2.

The invention uses both cast trailing edge slots and drilled trailing edge filmholes to achieve a beneficial arrangement. The trailing edge slots are used where core positioning is required and drilled filmholes are used in areas where cooling flow can be reduced. The filmholes can have various sizes, shapes, and spacing in order to achieve the necessary requirements.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
    a body having a leading edge, a trailing edge, and an external side surface extending from the leading edge to the trailing edge and from a radially inner end to a radially outer end, and wherein an axial direction is defined in a direction extending from the leading edge to the trailing edge, and a radial direction is defined as a direction that is perpendicular to the axial direction;
    at least one internal channel formed within the body, wherein the channel includes an inlet to direct cooling flow into the body;
    a plurality of cast slots formed in the external side surface along the trailing edge and having slot outlets spaced apart from each other in the radial direction; and
    a plurality of drilled filmholes formed in the external side surface along the trailing edge and having hole outlets spaced apart from each other in the radial direction, wherein the slot outlets and hole outlets are spaced apart from each other along the external side surface in the radial direction such that the cast slots and drilled filmholes direct flow from the internal channel to an external location from the body, and wherein the plurality of drilled filmholes and the plurality of cast slots are both aligned and spaced apart from each other in the radial direction along a common radial path that extends from the radially inner end to the radially outer end.

2. The gas turbine engine component according to claim 1 wherein the plurality of drilled filmholes include at least some drilled filmholes that are more closely spaced to each other in the radial direction than other drilled filmholes.

3. The gas turbine engine component according to claim 1 wherein
    the plurality of cast slots are all positioned radially outward of the plurality of drilled filmholes along the common radial path or the plurality of cast slots are all radially inboard of the plurality of drilled filmholes along the common radial path, or
    the plurality of cast slots are interspersed with the plurality of drilled filmholes in an alternating pattern along the common radial path such that one or more cast slots are directly between adjacent drilled filmholes and/or one or more drilled filmholes are directly between adjacent cast slots.

4. The gas turbine engine component according to claim 1 wherein the cast slots extend in the axial direction and the drilled filmholes extend at an obtuse angle relative to the cast slots.

5. The gas turbine engine component according to claim 1 wherein the body extends from a radially inner end to a radially outer end, and wherein all of the cast slots are positioned radially inward of the drilled filmholes or all of the cast slots are positioned radially outward of the drilled filmholes.

6. The gas turbine engine component according to claim 1 wherein each drilled filmhole has a hole inlet in communication with the internal channel and extends to the hole outlet to the external side surface, and wherein each cast slot has a slot inlet in communication with the internal channel and extends to the slot outlet to the external side surface, and wherein the cast slots are interspersed with the drilled filmholes in a radial direction along the trailing edge such that the hole outlets and the slot outlets are separate from each other in the radial direction and such that the hole outlets are spaced apart from the cast slots in the radial direction.

7. The gas turbine engine component according to claim 6 wherein the cast slots extend in the axial direction and the drilled filmholes extend at an obtuse angle relative to the cast slots.

8. The gas turbine engine component according to claim 1 wherein the body comprises a vane, blade or blade outer air seal.

9. The gas turbine engine component according to claim 1 wherein the body comprises a turbine component.

10. The gas turbine engine component according to claim 1 wherein each cast slot is spaced apart from each drilled filmhole along the common radial path.

11. A gas turbine engine comprising:
    a compressor section defining an engine center axis;
    a combustor section downstream of the compressor section; and
    a turbine section downstream of the combustor section, wherein the turbine section includes a turbine component having
        a leading edge extending to a trailing edge to define an axial direction along the engine center axis,
        an external side surface extending from the leading edge to the trailing edge,
        a radially inner end extending to a radially outer end to define a radial direction,
        at least one internal channel formed within the turbine component, wherein the channel includes an inlet to direct cooling flow into the turbine component,
        a plurality of cast slots formed in the external side surface along the trailing edge and having slot outlets spaced apart from each other in the radial direction, and a plurality of drilled filmholes formed in the external side surface along the trailing edge and having hole outlets spaced apart from each other in the radial direction, wherein the slot outlets and hole outlets are spaced apart from each other along the external side surface in the radial direction such that the cast slots and drilled filmholes direct flow from the internal channel to an external location from the turbine component, and wherein the plurality of drilled filmholes and the plurality of cast slots are both aligned and spaced apart from each other in the radial direction along a common radial path that extends from the radially inner end to the radially outer end.

12. The gas turbine engine according to claim 11 wherein the turbine component comprises a vane, blade or blade outer air seal, and wherein the plurality of cast slots are all positioned radially outward of the plurality of drilled filmholes along the common radial path or the plurality of cast slots are all radially inboard of the plurality of drilled filmholes along the common radial path, or the plurality of cast slots are interspersed with the plurality of drilled filmholes in an alternating pattern along the common radial path such that one or more cast slots are directly between adjacent drilled filmholes and/or one or more drilled filmholes are directly between adjacent cast slots.

13. The gas turbine engine according to claim 11 wherein the cast slots have a length greater than a width, and wherein the length extends in the axial direction and the drilled filmholes extend along an obtuse angle relative to the cast slots.

14. The gas turbine engine according to claim 11 wherein the cast slots are configured to position a core during a casting process for the turbine component.

15. The gas turbine engine according to claim 11 wherein each cast slot is spaced apart from each filmhole along the common radial path.

16. A method of manufacturing a gas turbine engine component comprising:

using a core to form at least one internal cooling channel in a body, wherein the body extends along an external side surface from a leading edge to a trailing edge and from a radially inner end to a radially outer end, and wherein an axial direction is defined in a direction extending from the leading edge to the trailing edge, and a radial direction is defined as a direction that is perpendicular to the axial direction;

providing a plurality of slots with the core to be located at the trailing edge, wherein the slots position the core during a casting process and form cast slots in the trailing edge that have slot outlets spaced apart from each other in the radial direction; and drilling a plurality of filmholes in the external side surface along the trailing edge subsequent to the casting process, the filmholes having hole outlets spaced apart from each other in the radial direction, and spacing the slot outlets and hole outlets apart from each other along the external side surface in the radial direction such that the cast slots and filmholes are configured to direct flow from the internal cooling channel to an external location from the body, and wherein the plurality of filmholes and the plurality of slots are both aligned and spaced apart from each other in the radial direction along a common radial path that extends from the radially inner end to the radially outer end.

17. The method according to claim 16 including casting the cast slots to extend in the axial direction and drilling the filmholes to extend at an obtuse angle relative to the cast slots.

18. The method according to claim 16 including interspersing the cast slots with the filmholes in the radial direction along the trailing edge such that the plurality of slots are all positioned radially outward of the plurality of filmholes along the common radial path or the plurality of slots are all radially inboard of the plurality of filmholes along the common radial path, or the plurality of slots are interspersed with the plurality of filmholes in an alternating pattern along the common radial path such that one or more slots are directly between adjacent filmholes and/or one or more filmholes are directly between adjacent slots.

19. The method according to claim 16 including tailoring filmhole sizes and spacing the filmholes relative to the cast slots to meet cooling flow requirements for a specified engine configuration.

20. The method according to claim 16 wherein each cast slot is spaced apart from each filmhole along the common radial path.

21. A method of controlling flow in a gas turbine engine component, the method comprising:

a body having a leading edge, a trailing edge, and an external side surface extending from the leading edge to the trailing edge and from a radially inner end to a radially outer end, and wherein an axial direction is defined in a direction extending from the leading edge to the trailing edge, and a radial direction is defined as a direction that is perpendicular to the axial direction;

at least one internal channel formed within the body, wherein the channel includes an inlet to direct cooling flow into the body; and arranging a plurality of flow exit features along the trailing edge to tailor cooling flow to a predetermined amount at each desired location along an entire radial span of the trailing edge by providing one portion of trailing edge flow with cast slots that are spaced apart from each other in the radial direction and providing another portion of trailing edge flow with drilled film holes that are spaced apart from each other in the radial direction such that outlets from the drilled filmholes are in the external side surface and spaced apart from the cast slots in the radial direction, and wherein the drilled filmholes and the cast slots are both aligned and spaced apart from each other in the radial direction along a common radial path that extends from the radially inner end to the radially outer end.

22. The method according to claim 21 wherein each cast slot is spaced apart from each drilled hole along the common radial path such that the cast slots are all positioned radially outward of the drilled filmholes along the common radial path or the cast slots are all radially inboard of the drilled filmholes along the common radial path, or the cast slots are interspersed with the drilled filmholes in an alternating pattern along the common radial path such that one or more cast slots are directly between adjacent drilled filmholes and/or one or more drilled filmholes are directly between adjacent cast slots.

* * * * *